(12) United States Patent
Ben-Shalom et al.

(10) Patent No.: US 9,166,440 B2
(45) Date of Patent: Oct. 20, 2015

(54) SYSTEM FOR TRANSFERRING POWER INDUCTIVELY TO ITEMS WITHIN A CONTAINER

(75) Inventors: Amir Ben-Shalom, Modiin (IL); Arik Rofe, Jerusalem (IL); Oola Greenwald, Mevasseret zion (IL); Guy Raveh, Mataa (IL); Elieser Match, Rosh Tzurim (IL)

(73) Assignee: Powermat Technologies Ltd., Neve Ilan (IL)

( * ) Notice: Subject to any disclaimer, the term of this patent is extended or adjusted under 35 U.S.C. 154(b) by 60 days.

(21) Appl. No.: 13/978,865

(22) PCT Filed: Jan. 10, 2012

(86) PCT No.: PCT/IL2012/050010
§ 371 (c)(1),
(2), (4) Date: Jul. 9, 2013

(87) PCT Pub. No.: WO2012/095850
PCT Pub. Date: Jul. 19, 2012

(65) Prior Publication Data
US 2013/0285606 A1 Oct. 31, 2013

Related U.S. Application Data

(60) Provisional application No. 61/431,122, filed on Jan. 10, 2011, provisional application No. 61/583,827, filed on Jan. 6, 2012.

(51) Int. Cl.
*H02J 7/00* (2006.01)
*H02J 7/02* (2006.01)
(Continued)

(52) U.S. Cl.
CPC .............. *H02J 7/025* (2013.01); *H02J 7/0027* (2013.01); *H02J 7/045* (2013.01); *H02J 7/047* (2013.01); *H02J 17/00* (2013.01); *H02J 2007/0096* (2013.01); *Y10T 307/25* (2015.04)

(58) Field of Classification Search
CPC ........... H02J 7/025; H02J 7/0027; H02J 7/00; H02J 7/0096; H02J 5/005; H01F 38/04; H04B 5/0037; H04B 5/0081; H04B 5/00
USPC ........................................................ 320/108
See application file for complete search history.

(56) References Cited

U.S. PATENT DOCUMENTS

2005/0068019 A1 3/2005 Nakamura
2006/0033602 A1* 2/2006 Mattsson ...................... 336/200
(Continued)

FOREIGN PATENT DOCUMENTS

WO 2008038203 A2 4/2008

OTHER PUBLICATIONS

International Search Report dated Jul. 2, 2012, for corresponding PCT Application PCT/IL2012/050010.
(Continued)

*Primary Examiner* — Vuthe Siek
(74) *Attorney, Agent, or Firm* — Brooks Kushman P.C.

(57) ABSTRACT

An inductive power transfer system includes an inductive power transmitter in the shape of a container that is capable of holding one or more electrical devices. The system is operable to transfer power inductively to devices stowed within the container via inductive power receivers. The inductive power transmitter includes at least one primary inductor configured to couple inductively with at least one secondary inductor and at least one driver configured to provide a variable electric potential at a driving frequency across said primary inductor. The inductive power receiver may comprise at least one secondary inductor connectable to a receiving circuit and an electric load, said secondary inductor configured to couple inductively with said at least one primary inductor such that power is transferred to said electric load.

20 Claims, 8 Drawing Sheets

(51) Int. Cl.
*H02J 17/00* (2006.01)
*H02J 7/04* (2006.01)

(56) References Cited

U.S. PATENT DOCUMENTS

| | | | |
|---|---|---|---|
| 2009/0096413 A1* | 4/2009 | Partovi et al. | 320/108 |
| 2010/0219183 A1 | 9/2010 | Azancot | |
| 2010/0219697 A1* | 9/2010 | Azancot et al. | 307/104 |
| 2011/0304220 A1* | 12/2011 | Whitehead | 307/104 |
| 2013/0049484 A1* | 2/2013 | Weissentern et al. | 307/104 |

OTHER PUBLICATIONS

Written Opinion of the International Searching Authority dated Jul. 10, 2013, for corresponding PCT Application PCT/IL2012/050010.
International Preliminary Report on Patentability dated Jul. 10, 2013, for corresponding PCT Application PCT/IL2012/050010.

* cited by examiner

SYSTEM FOR TRANSFERRING POWER INDUCTIVELY TO ITEMS WITHIN A CONTAINER

CROSS REFERENCE TO RELATED APPLICATIONS

This application is the U.S. national phase of PCT/IL2012/050010 filed Jan. 10, 2012, which claims the benefit of U.S. Provisional Application No. 61/583,827 Filed Jan. 6, 2012, and U.S. Provisional Application No. 61/431,122 Filed Jan. 10, 2011, the disclosures of which are hereby incorporated by reference in their entirety.

FIELD OF THE DISCLOSURE

The embodiments disclosed herein relate to inductive power transfer systems. In particular the embodiments relate to inductive power transfer systems operable to transfer power to items within a container.

BACKGROUND

Inductive power coupling, as known in the art, allows energy to be transferred from a power supply to an electric load without connecting wires. A power supply is wired to a primary coil and an oscillating electric potential is applied across the primary coil, thereby inducing an oscillating magnetic field. The oscillating magnetic field may induce an oscillating electrical current in a secondary coil placed close to the primary coil. In this way, electrical energy may be transmitted from the primary coil to the secondary coil by electromagnetic induction without the two coils being conductively connected.

When electrical energy is transferred from a primary coil to a secondary coil the coil pair are said to be inductively coupled. An electric load wired in series with such a secondary coil may draw energy from the power source wired to the primary coil when the secondary coil is inductively coupled thereto.

Induction type power outlets may be preferred to the more common conductive power sockets because they provide seamless power transmission and minimize the need for trailing wires.

The range of the inductive transmission as well as the strength of the induced voltage in the secondary inductor both vary according to the oscillating frequency of the electrical potential provided to the primary inductor. The induced voltage is strongest when the oscillating frequency equals the resonant frequency of the system. The resonant frequency $f_R$ depends upon the inductance L and the capacitance C of the system according to the equation $$f_R = \frac{1}{2\pi\sqrt{LC}}.$$

Efficiency of energy transfer depends upon a number of parameters including the resonant frequency of the system, the transmission frequency of operation as well as the distance and alignment between the primary and secondary inductive coils. Very close proximity and alignment of orientation between the primary and secondary inductors are factors in optimal inductive coupling, but this arrangement is not always practical. There is a need for an inductive power transmission system that is capable of power transmission to transmit power to one or more secondary inductors placed at a wide range of distances and orientations in relation to the primary inductors. The embodiments described herein address this need.

SUMMARY OF THE EMBODIMENTS

The embodiments described herein disclose an inductive power transfer system comprising at least one of: an inductive power transmitter and an inductive power receiver.

The inductive power transmitter may comprise at least one primary inductor configured to couple inductively with at least one secondary inductor and at least one driver configured to provide a variable electric potential at a driving frequency across said primary inductor. The inductive power receiver may comprise at least one secondary inductor connectable to a receiving circuit and an electric load, said secondary inductor configured to couple inductively with said at least one primary inductor such that power is transferred to said electric load.

Transmitter

In certain embodiments of the system, the inductive power transmitter may be in the shape of a container that is capable of holding one or more inductive power receivers. The container shape may be any shape that creates a three dimensional space within an indentation. Examples of such shapes include a sphere, a cube, a cuboid, a cylinder, a cone, a pyramid, a prism, and the like. Other examples include a cup-like shape, a bucket-like shape and a box-like shape. The container may be open, closed, or capable of alternating between an open and closed arrangement, e.g., with a lid or door.

Optionally, the inductive power transmitter may be a separate unit. Alternatively, the inductive power transmitter may be integrated into another item, such as an item of furniture, e.g., a drawer, a desk, a table, a sofa, a cabinet compartment, a kitchen counter, a television table, a toy box, a tool box, or another electronic device.

In certain embodiments of the system, the inductive power transmitter comprises a plurality of primary inductors, wherein said primary inductors are positioned such that a first primary inductor produces a magnetic field in an orientation that is different from the orientation of the magnetically field produced by a second primary coil.

Optionally, the orientations of said at least two primary inductors are orthogonal to each other.

In certain embodiments of the system, the primary inductors may be placed on opposing sides of the inductive power transmitter.

In certain embodiments of the system, the inductive power transmitter may be in the shape of a box comprising three primary inductors, each primary inductor situated in three adjacent walls of the box: a first primary inductor situated in the bottom wall, and the second and third primary inductors situated in two adjacent side walls, such that each of the primary inductors are oriented orthogonally to each other.

In certain embodiments of the system, the inductive power transmitter is operable in a plurality of modes, a mode being characterized by the activation of said at least one primary inductor. A mode may be characterized by the activation of at least one primary inductor creating a magnetic field in a defined orientation. Alternatively or in addition, a mode may be characterized by the activation of at least one primary inductor located on a defined surface or portion of the inductive power transmitter. The inductive power transmitter may further comprise a mode selector configured to sequentially switch the inductive power transmitter between said plurality of modes.

Receiver

In certain embodiments of the system, the inductive power receiver may further comprise a resonance tuner.

Optionally, the tuner is operable to tune a resonant frequency of said receiving circuit to the driving frequency of the primary inductor.

Optionally, the tuner is operable to tune a resonant frequency of the inductive power transfer system such that the inductive power transmitter and the inductive power receiver are resonantly coupled.

In certain embodiments of the system, the inductive power receiver system may further comprise a resonance seeking arrangement operable to determine the natural resonant frequencies of the inductive power transfer system.

In certain embodiments of the system, the inductive power receiver comprises a regulator operable to trickle charge the load, e.g., an electrochemical cell.

Optionally, the regulator is configured to produce a low current for charging the load. The rate of charging may be substantially the same as the self-discharging rate of the load.

Optionally, the regulator is operable to monitor the discharge voltage of the load, such that if the load discharge voltage is at a reference level signifying full charge, the switching unit may disconnect the load from the induced output voltage, and if the load discharge voltage falls below the reference level, the switching unit may connect the load to the induced output voltage, thus resuming charging.

In certain embodiments of the system, an electrical device is presented incorporating the inductive power receiver. Variously, the electrical device may be selected from a group consisting of: remote control units, telephones, media players, PDAs, Walkmans, portable music players, dictaphones, portable DVD players, mobile communications devices, calculators, mobile phones, hairdryers, shavers, defoliators, delapidators, wax-melting equipment, hair curlers, beard trippers, lights, radios, electric knives, cassette players, CD players and the like.

In certain embodiments of the system, the electrical load may be an electrochemical cell, a battery or a supercapacitor.

In certain embodiments of the system, the electrical load may be an electrochemical cell selected from the group consisting of a lithium-thionyl chloride cell, a Li/SOCl2 Cell, a Li/SO2 Cell, a Li/MnO2 Cell, a Lithium Polymer Cell, a Special Cell, a Mobile Phone Cell, a Charger Li-ion Cell, a NiMH Cells and a New Products NiCd Cells.

In certain embodiments of the system, the inductive power receiver may be in a shape that is substantially the same as, and compatible with typical connection mechanisms for, standard battery shapes selected from the group consisting of AAA, U16, Micro, Microlight, MN2400, MX2400, Type 286, UM 4, #7, 6135-99-117-3143, AA, U7, Pencil sized, Penlight, Mignon, MN1500, MX1500, Type 316, UM3, #5, 6135-99-052-0009, 6135-99-195-6708, C, U11, MN1400, MX1400, Baby, Type 343, BA-42, UM2, #2, 6135-99-199-4779, 6135-99-117-3212, D, U2, Flashlight Battery, MN1300, MX1300, Mono, Type 373, BA-30, UM1, #1, 6135-9-464-1938, 6135-99-109-9428, 9-Volt, PP3, Radio Battery, Smoke Alarm, MN1604, Square Battery, Krona, Transistor, 6135-99-634-8080, Watch Cell, Button Cell, Coin Cell, Micro Cell and Miniature Cell.

In certain embodiments of the system, the electrical load may be shielded.

In certain embodiments of the system, the secondary inductor is a coil of conducting wire that is wrapped around the exterior of the inductive power receiver.

Optionally, said inductive power receiver may comprise a plurality of secondary inductors arranged in a plurality of orientations.

System

In certain embodiments of the system, the inductive power transfer system further comprises a position sensor for monitoring the position of the inductive power receiver in relation to the inductive power transmitter. Preferably, the sensor monitors the presence of the inductive power receiver in the interior space of the container-shaped inductive power transmitter. The sensor may be configured such that the presence of the inductive power receiver in the interior space of the inductive power transmitter activates the inductive power transmitter to transmit power to the inductive power receiver. Said position sensor may comprise a communication management element managed by a variety of protocols, such as (but not limited to) an NFC tag, Bluetooth, WiFi, or the like.

In certain embodiments of the system, the inductive power transfer system further comprises an auxiliary coil arrangement comprising a plurality of auxiliary coils operable in at least one of: a conductor setting, a repeater setting and a transmission setting.

Optionally, the auxiliary coil arrangement comprises: at least one auxiliary coil; at least one controller configured to select an operational setting for the auxiliary coil; and at least one switching unit operable to selectively connect the auxiliary coil to at least one of a conductive setting block, a repeater setting block and a transmission setting block.

In certain embodiments of the system, the inductive power transmitter is operable to transmit power to said inductive power receiver when the inductive power transmitter and the inductive power receiver are coupled with a low coefficient of coupling ("loose coupling").

Optionally, the inductive power transmitter and the inductive power receiver are configured to be resonantly coupled.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DESCRIPTION OF THE SELECTED EMBODIMENTS

Figure 1:
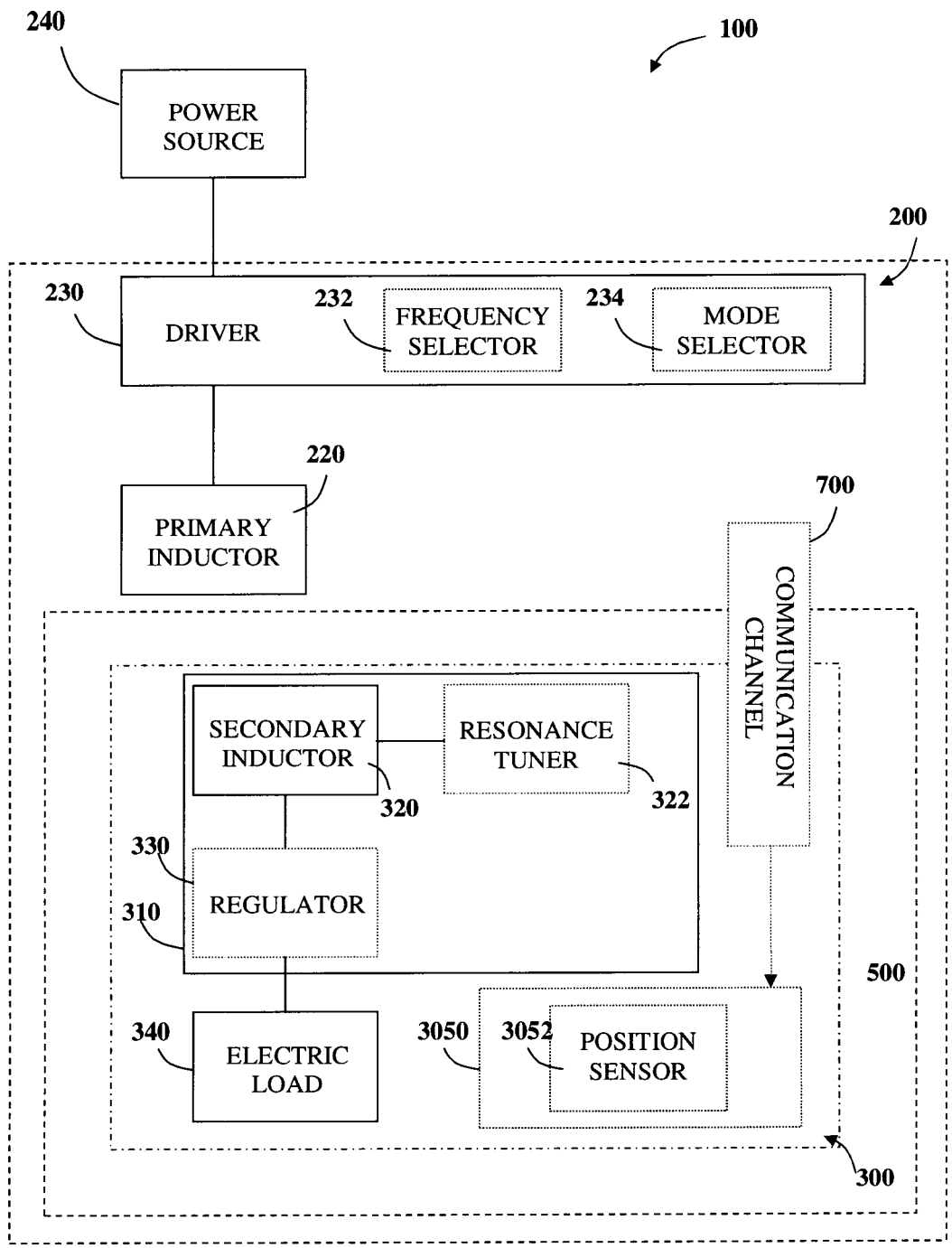
FIG. 1 is a block diagram showing the main elements of an inductive power transfer system operable to provide power from an inductive power transmitter to an inductive power receiver within the interior of the inductive power transmitter.

Reference is now made to FIG. 1, which shows a block diagram showing various elements of an inductive power transfer system 100 operable to provide power inductively from an inductive power transmitter 200 to an inductive power receiver 300 over an extended region within the interior of the inductive power transmitter.

The inductive power transmitter 200 includes a primary inductor 220 and a driver 230. The inductive power transmitter 200 may be connected to a power source 240 such as a mains electricity socket, a transformer, a power pack, solar panel or the like. The driver 230 is operable to provide a variable electric potential across the primary inductor 220 at a selected driving frequency thereby producing an oscillating magnetic field that may be used to induce an electric potential in a secondary inductor 320 of an inductive receiver 300. The inductive power transmitter 200 includes an interior space 500 into which an inductive power receiver may be placed.

The inductive power receiver 300 includes a secondary inductor 320, which may be wired to an electric load 340 via a reception circuit 310. The secondary inductor 320 is configured to generate an oscillating induced voltage when placed inside the oscillating magnetic field produced by a primary inductor 220.

The power reception range over which the inductive power receiver 300 may receive power from the inductive power transmitter 200 may depend upon a number of factors including the strength and extension of the oscillating magnetic field, the size and position of the primary inductor, the frequency of power transfer, the resonant frequency of the reception circuit 310, the efficiency of power transfer and the like.

Features of the inductive power transmission system 100 described herein may allow the power reception range to be extended allowing efficient inductive power transfer over a larger region within the interior of the inductive power transmitter. A primary inductor with a driving voltage oscillating at a certain frequency tend to couple with a secondary inductor whose resonant frequency matches with the frequency of the oscillating driving voltage, while weakly interacting with other objects having non-matching resonant frequencies. Weak interactions with said other objects also reduce the dissipation of power from the inductive power transmitter into unwanted targets. Further, in such resonant inductive coupling, power transfer from the primary inductor to the secondary inductor can occur without a need to precisely align the primary inductor and the secondary inductor.

In particular, the system 100 may be configured for the primary and secondary inductors to be loosely coupled, thus allowing inductive power transfer over longer ranges, rather than over a short range that may require a degree of specificity in the relative positions, e.g., alignment, as well as short distances between the primary and secondary inductors.

Inductive Power Transmitter

The inductive power transmitter 200, or a portion thereof, may be in the shape of a container. A container shape may be any shape that creates a three dimensional space therewithin, such as an indentation, chamber, recess, cavity or the like. Such an interior space that may serve as a power transmission space in which to place one or more inductive power receivers. Examples of container shapes include a sphere, a cube, a cuboid, a cylinder, a cone, a pyramid, a prism, and the like. Other examples of container shapes include a cup-like shape, a bucket-like shape, a box-like shape, and the like. The container may be open, closed, or capable of alternating between an open and closed state, e.g., with a lid or door.

The inductive power transmitter 200 may be a stand-alone unit. Optionally, the inductive power transmitter 200 may be insertable into another item, such as piece of furniture, e.g., a drawer, a desk, a table, a sofa, a cabinet compartment, a kitchen counter, a television table, a toy box, a tool box and the like. Additionally or alternatively, the inductive power transmitter 200 may be integrated into another item, such as the piece of furniture, e.g., a drawer, a desk, a table, a sofa, a cabinet compartment, a kitchen counter, a television table, a toy box, a tool box and the like. Optionally, the inductive power transmitter 200 may be shaped as another item, such as piece of furniture, e.g., a drawer, a desk, a table, a sofa, a cabinet compartment, a kitchen counter, a television table, a toy box, a tool box and the like. Optionally, the inductive power transmitter 200 may be integrated into another electronic device, for example integral to an electrical appliance such as a refrigerator, cooker, television, computer, printer, photocopier unit or the like. It is noted that such a container may further be integrated into a vehicle such as a car, truck, boat or the like, possible to be powered from the onboard power source such as a car battery or the like.

The inductive power transmitter 200 may contain multiple primary inductors 220 incorporated within it. The multiple primary inductors may be configured in the inductive power transmitter in different orientations and/or positions. For example, in an inductive power transmitter shaped as a cube, a first primary inductor and a second primary inductor may be placed on adjacent walls. Alternatively or in combination, a first primary inductor and a second primary inductor may be placed on opposing walls. Alternatively or in combination, one wall may comprise more than one primary inductor (e.g., as an array of primary inductors). The cube-shaped inductive power transmitter may comprise one or more primary inductors in two, three, four, five or all six of its six walls. Alternatively or in combination, the inductive power transmitter may contain a plurality of interior spaces serving as power transmission spaces. Alternatively or in combination, a power transmission space may be subdivided into a plurality of power transmission spaces. The presence of multiple primary inductors in different positions and/or orientations improve the likelihood that at least one primary inductor will be coupled to the secondary inductor of an inductive power receiver placed freely within the interior space of the inductive power transmitter.

Figure 2:
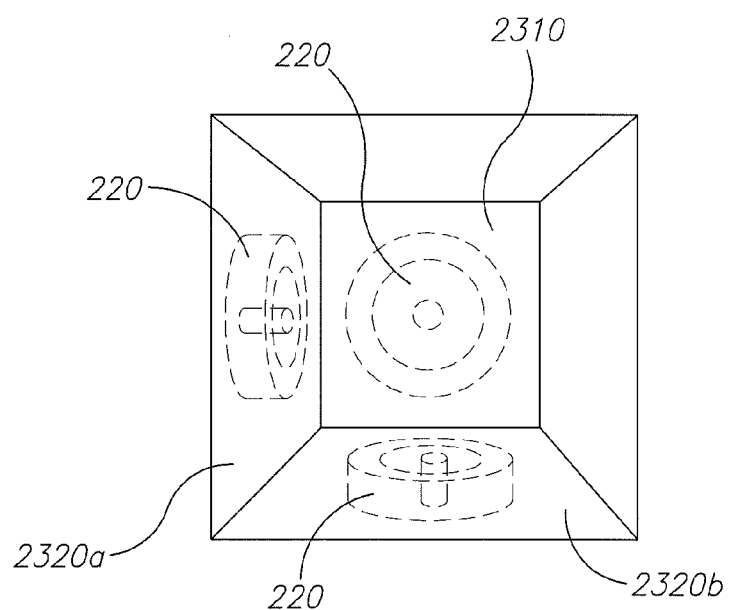
FIG. 2 is a schematic diagram representing an example of a configuration of primary inductors in the inductive power transmitter.
Figure 3:
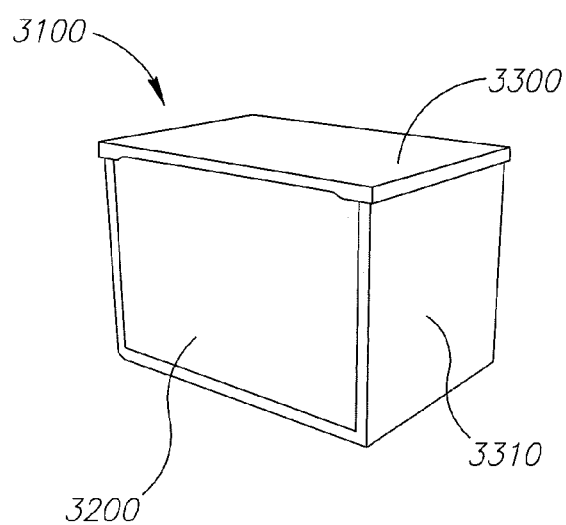
FIG. 3 shows an example of an inductive power transmitter.

In reference to FIG. 2, the inductive power transmitter may be in the shape of a box comprising three primary inductors, each primary inductor situated in three adjacent walls of the box: a first primary inductor situated in the bottom wall_2310, and the second and third primary inductors situated in two adjacent side walls 2320A, 2320B, such that each of the primary inductors are oriented orthogonally to each other. In such an arrangement of primary inductors, the inductive power transmitter is operable to generate a magnetic field in three orientations orthogonal to each other: along the x-axis, the y-axis and the z-axis of the box. FIG. 3 shows an example of a box-shaped inductive power transmitter 3100. The transmitter 3100 contains an internal space 3200 and is closable by a lid 3300. Optionally, more than one primary inductor may be situated in each wall 3310.

Figure 4:
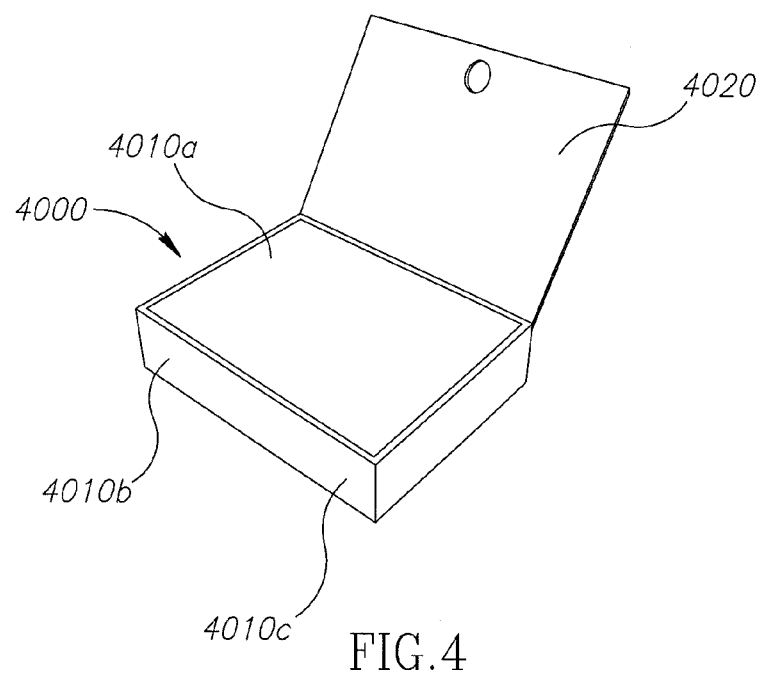
FIG. 4 shows an example of an inductive power transmitter.

In reference to FIG. 4, the inductive power transmitter 4000 may have a power transmission space that is subdivided into a plurality of power transmission spaces 4010A-C through the placement of internal walls within the main power transmission space. The power transmitter 4000 may be closable by a lid 4020 which may be hinged slidable or the like. In one embodiment, the inductive power transmitter comprises three primary inductors, each primary inductor situated in three adjacent external walls of the box: a first primary inductor is situated in the bottom wall, and the second and third primary inductors are situated in two adjacent side walls, such that each of the primary inductors are oriented orthogonally to each other. Alternatively, or in addition, each internal wall comprises a primary inductor. Optionally, more than one primary inductor may be situated in a wall. For convenience, where appropriate, indications may be provided in the power transmission spaces, displaying items which may be usefully stored within such as a camera, a flashlight, loose cells, a mobile phone and the like. Optionally, the shapes or dimensions of the power transmission spaces may be appropriate for the stowage of particular may provide such indication.

Figure 5:
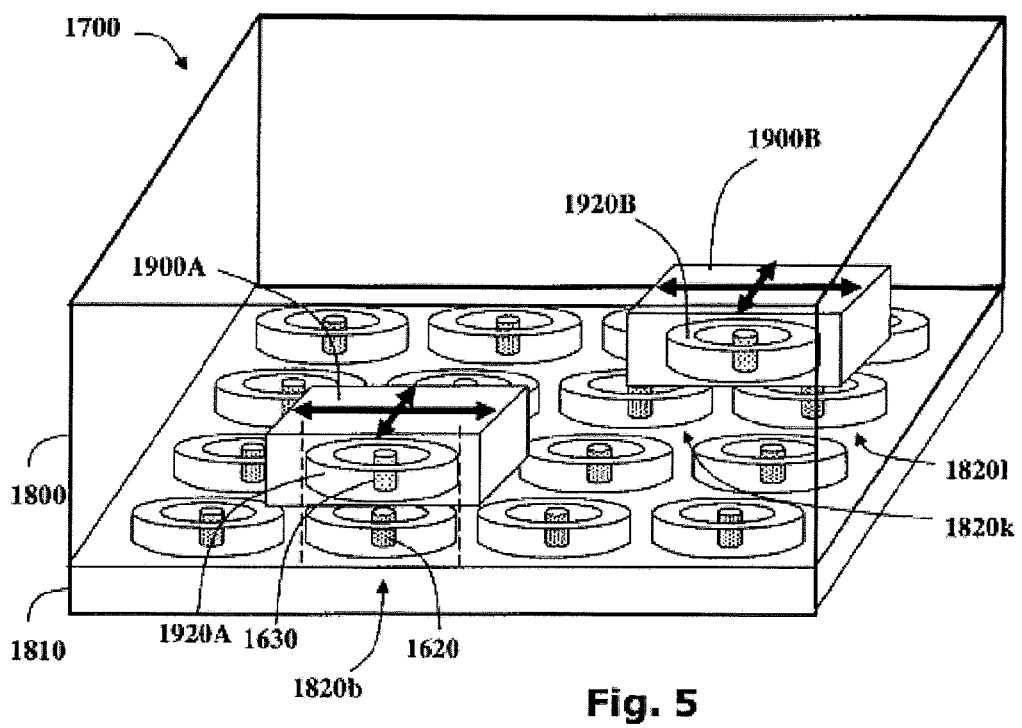
FIG. 5 is a schematic representation of a further inductive power transfer system in which a transmitter including an array of multiple primary inductors provides power to two receivers.

Referring now to FIG. 5, showing a schematic representation of a further inductive power transfer system 1700. The power transfer system 1700 with at least one wall 1810 of an inductive power transmitter container 1800 comprising multiple primary inductors 1820 arranged in an array. The primary inductors may be arranged in triangular, quadrangular, hexagonal geometries or the like or alternatively may be spaced out throughout the wall 1810 of the container 1800. Inductive power receivers 1900 are provided having secondary inductors 1920 configured to receive power inductively from the primary inductors 1820. It will be appreciated that typically such inductive power receivers 1900 would be connected to electric loads (not shown).

It is noted that a first inductive receiver 1900A is shown having a secondary inductor 1920A aligned to one primary inductor 1820b. A second inductive receiver 1900B is shown having a secondary inductor 1920B which is not aligned to any particular primary inductor 1820, but placed in between two primary inductors 18201, 1820k of the array. It is a feature of the inductive power transfer system that the second inductive power receiver 1900B is operable in a loosely coupled fashion such that its resonant frequency is tuned to the driving frequency of at least one of the primary inductors of the array. Thus power transmission may continue even while the inductive power receiver is moved over the surface, or is situated at some distance from the surface.

Although FIG. 5 only represents a single array of primary inductors in a single wall 1810 of the container 1800, it is noted that multiple arrays may be provided. Optionally, additional inductor arrays may be provided in other walls of the container. Furthermore, FIG. 5 shows non-overlapping primary inductors arranged in an array along a single plane. However, the primary inductors may alternatively be arranged such that the primary inductors are arranged over a plurality of planes, with overlapping primary inductors.

The inductive power transmitter 200 may be operable in a plurality of modes, each mode being characterized by the activation of said at least one primary inductor 220. Alternatively or in addition, a mode may be characterized by the activation of multiple primary inductors 220, e.g., arranged in an array, such that the mode is characterized by the activation of a magnetic field in a defined orientation. Alternatively or in addition, a mode may be characterized by the activation of a magnetic field in a defined location within the interior of the inductive power transmitter, or in a defined position along the surface of the inductive power transmitter.

Figure 6:
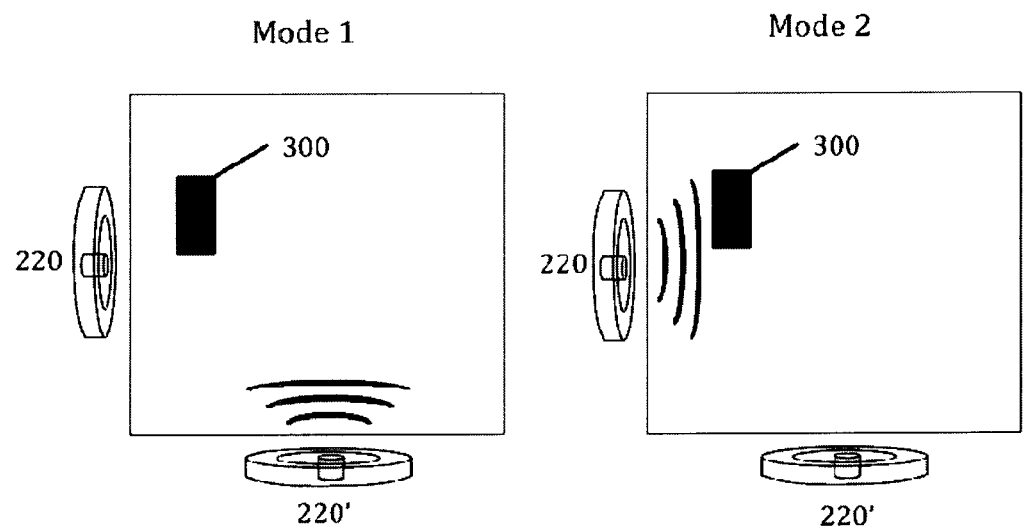
FIG. 6 is a schematic diagram representing a plurality of modes for an inductive power transmitter containing an inductive power receiver.
Figure 7:
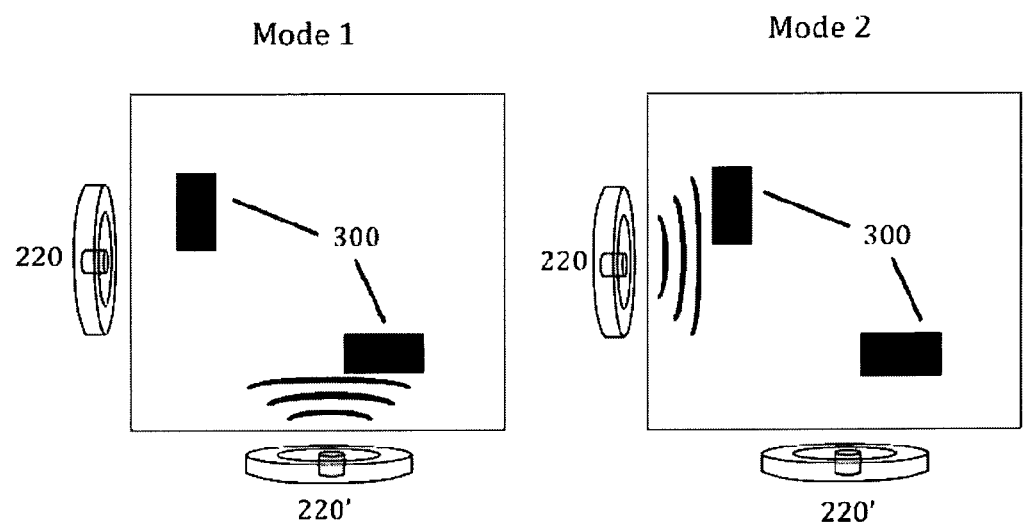
FIG. 7 is a schematic diagram representing a plurality of modes for an inductive power transmitter containing a plurality of inductive power receivers.

The inductive power transmitter 200 may further comprise a mode selector 234 configured to sequentially switch, or cycle through, the activation of the primary inductors incorporated in the inductive power transmitter between each, or alternatively a subset, of the plurality of modes. By sequentially activating magnetic fields of different orientations and/or locations, the ability of the inductive power transmitter 200 to transfer power to an inductive power receiver 300 within the interior of the inductive power transmitter may be improved. For example, even if the position or orientation of one primary inductor 220 (or a group of primary inductors) is ineffective or poorly effective in transferring power to a secondary inductor 320 of an inductive power receiver 300 located within the interior of the inductive power transmitter 200, another primary inductor 220' (or a group of primary inductors) that is better positioned or oriented will be activated during the cycling of mode activations. See, e.g., FIG. 6. This is also the case when multiple inductive power receivers are placed in disparate locations and orientations in the interior of the inductive power transmitter 200. The cycling of modes may, over time, allow the activation of a primary inductor 220 (or a group of primary inductors) that is better situated for transmitting power to each of the secondary inductors present within the inductive power transmitter. See, e.g., FIG. 7.

The cycling of activation between modes can be made in a variety of arrangements. For example, in a box shaped inductive power transmitter comprising a primary inductor in at least two walls, the cycling of modes may be such that each primary inductor is sequentially activated. Alternatively or in addition, in an inductive power transmitter comprising an array of primary inductors, the cycling of modes may be such that each primary inductor of the array, or each subset of primary inductors of the array, is sequentially activated. Alternatively or in addition, an inductive power transmitter comprises a plurality of arrays, each array comprising a plurality of primary inductors, and each array is activated sequentially.

A mode may further be characterized by a least two primary inductors in an array of primary inductors being activated simultaneously. In such a case, the driving voltage supplied to a each primary inductor may be controlled independently. The driving voltage supplied to a first primary inductor may be in phase, or phase-shifted in relation to the driving voltage supplied to a second primary inductor. For example, the first and second primary inductors may be supplied with driving voltages with a phase shift of 180 degrees such that the driving voltage of the first primary inductor is in antiphase to the driving voltage of the second primary inductor. As such, a first mode may be characterized by an array of primary inductors being simultaneously activated with the driving voltage of each primary inductor being in phase. A second mode may be characterized by an array of primary inductors being simultaneously activated with the driving voltage of each primary inductor being in antiphase to the primary inductor next to it.

A mode may be characterized by a subset of primary inductors being activated simultaneously, and further characterized by the phase relationship among the primary inductors. For example, in an array of 4×4 primary inductors, such as the one shown in FIG. 5, a first mode may be characterized a first set of 3×3 primary inductors being activated in phase. A second mode is characterized by said first set of primary inductors being activated such that the voltage driving each primary inductor is in antiphase to the voltage driving the adjacent primary inductor. A third mode may be characterized by a second set of 3×3 primary inductors being activated in phase. A fourth mode is characterized by said second set of primary inductors being activated such that the voltage driving each primary inductor is in antiphase to the voltage driving the adjacent primary inductor. Further modes, up to mode n, is characterized by each set of 3×3 primary inductors being activated in phase or alternatively in antiphase. Other mode cycling protocols will occur to those working in the art. Indeed, automated systems may execute algorithms to optimize cycling protocols to suit the distribution of receivers placed within the container, as required.

Auxiliary Coils

Referring back to FIG. 1, the driver 230 of the inductive power transmitter 200 is operable to provide a variable electric potential across the primary inductor 220, typically a primary coil, thereby producing an oscillating magnetic field in the vicinity of the primary inductor 220. When the secondary inductor 320, typically a secondary coil, of an inductive power receiver 300 is placed within the oscillating magnetic field produced by the primary inductor 220, an oscillating induced voltage is generated.

The power reception range over which the inductive power receiver 300 may receive power from the inductive power transmitter 200 may depend upon the strength and extension of the oscillating magnetic field. In addition, the efficiency of power transfer from a primary inductor to a secondary inductor not aligned thereto may be increased by introducing one or more auxiliary coils between the primary inductor 220 and the secondary inductor 320. Thus the power reception range of the inductive power transmitter 200 may be extended.

Auxiliary Coil Settings

Figure 8A:
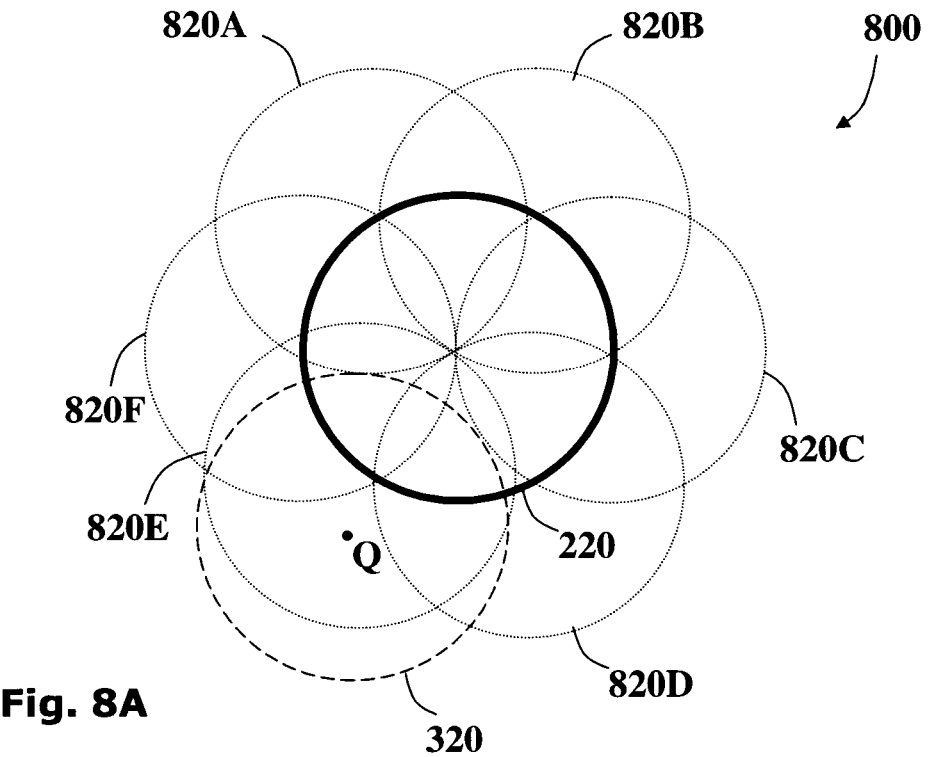
FIG. 8A shows one possible geometry of a possible auxiliary coil arrangement for use in an inductive power transfer system.

Referring to FIG. 8A, representing a possible auxiliary coil arrangement 800, the auxiliary coil arrangement 800 includes an array of six auxiliary coils 820a-f arranged around the primary coil 220. A hexagonal array is described with the axis of each auxiliary coil 820A-F shifted from the axis of the primary coil 220 and from each other by a radius length. It will be appreciated that in other systems, alternative geometrical arrangements may be preferred to suit requirements. The auxiliary coils 820 may be configured to operate in one or more of a plurality of settings as described below. Possible auxiliary coil settings include: (i) a conductor setting, (ii) a repeater setting, (iii) a transmission setting or (iv) a stand-by setting.

Figure 8B:
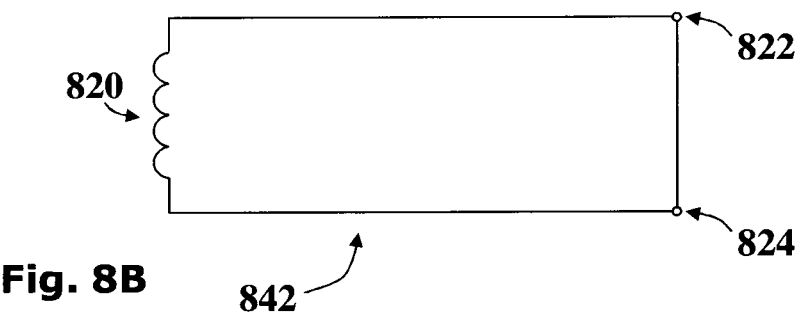
FIG. 8B shows a possible auxiliary coil circuit configured in conductor mode.
Figure 8C:
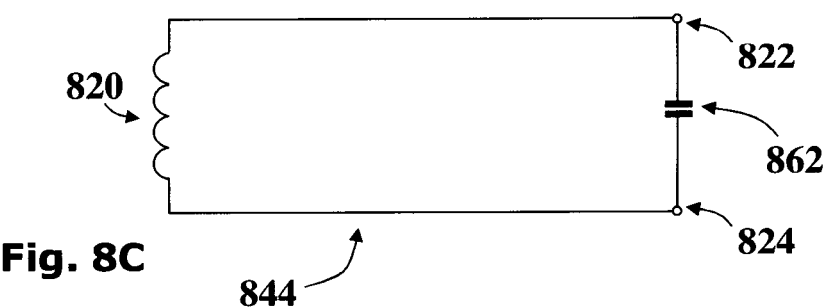
FIG. 8C shows a possible auxiliary coil circuit configured in repeater mode.
Figure 8D:
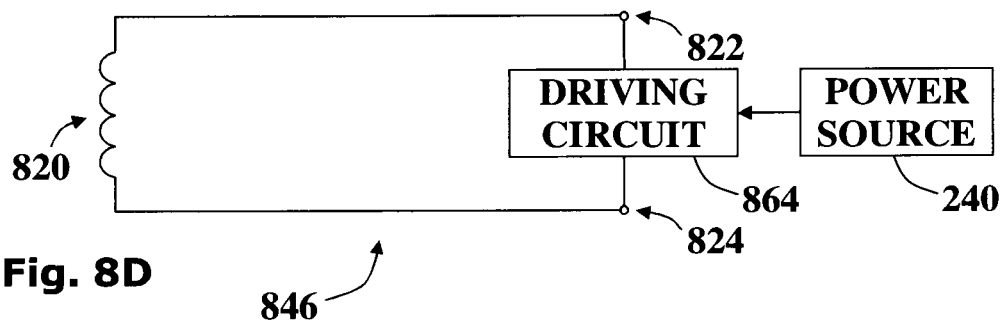
FIG. 8D shows a possible auxiliary coil circuit configured in transmission mode.

The circuit diagram of FIG. 8B shows a possible auxiliary coil circuit 842 configured in a conductor setting. The circuit diagram of FIG. 8C shows a possible auxiliary coil circuit 844 configured in a repeater setting. The circuit diagram of FIG. 8D shows a possible auxiliary coil circuit 846 configured in a transmission setting.

Conductor Setting

With particular reference now to FIG. 8B, in a conductor setting, the terminals 822, 824 of the auxiliary coil 820 are conductively connected, possibly via a resistor (not shown). In this configuration, the auxiliary coil behaves as a sheet conductor introduced. When a secondary inductor 320 is laterally shifted from the primary inductor 220, the efficiency of energy transfer thereto increases when a sheet conductor is introduced to cover the 'exposed' region of the primary inductor. This phenomenon is related to changes in the natural resonant frequency of the system in the presence of the conductor or a consequence of the flux lines being guided more efficiently to the secondary inductor 320.

In consequence of the above-described phenomenon, inductive power transfer between a primary inductor 220 and a non-aligned secondary inductor 320 may be improved by operating at least a portion of the auxiliary coils 820 covering the exposed section of the primary inductor 220 in a conductor setting. Referring back to FIG. 8A, for example, if a secondary inductor 320 was centered at point Q, say, efficiency of energy transfer may be improved by operating auxiliary coils 820A-C in a conductor setting.

Repeater Setting

With particular reference now to FIG. 8C, in a repeater setting, the terminals 822, 824 of the auxiliary coil 820 are connected via a capacitor 862. It is noted that in a repeater setting, a secondary voltage may be induced in the auxiliary coil itself, which in turn produces its own oscillating magnetic field having the same frequency as the primary inductor. By introducing at least one auxiliary coil in a repeater setting between a secondary inductor 320 and a primary inductor 220, the efficiency of energy transfer may be increased at larger ranges. Referring back again to FIG. 8A, for example, if a secondary inductor 320 was centered at point Q, efficiency of energy transfer may be improved by operating auxiliary coil 820E in a repeater setting.

Furthermore, by using one or more auxiliary coils in a repeater setting, the power reception range may be extended vertically above the primary inductor. Indeed, a series of repeaters may be used as stepping stones to extend the range of the primary inductor 220 still further.

It is noted that in a conductor setting and a repeater setting, the auxiliary coils need not be connected to any power supply and power is drawn by the secondary inductor 320 from the primary inductor alone.

Transmission Setting

With particular reference now to FIG. 8D, in a transmission setting, the terminals 822, 824 of the auxiliary coil 820 are connected to a driving circuit 864 wired to a power source 240 and operable to produce an oscillating voltage across the auxiliary coil. Accordingly, in a transmission setting, the auxiliary coil 820 may serve as an additional primary coil transmitting power to the secondary inductor 320.

The driving circuit 864 may be operable to drive the auxiliary coil 820 independently from the primary inductor 220. Thus the driving voltage supplied to the auxiliary coil 820 may be phase shifted from that supplied to the primary inductor 220.

Coordination between the primary inductor 220 and one auxiliary coil 820 is now illustrated with reference to FIG. 8E, which schematically shows possible locations A and B of a secondary coil 320 relative to a primary inductor 220 and one auxiliary coil 820. The auxiliary coil 820 is spaced at a distance of one radius from the primary inductor 220.

When the secondary inductor 320 is located at position A, halfway between the primary inductor 220 and the auxiliary coil 820, energy transfer to the secondary inductor may be improved by operating the auxiliary coil 820 in phase with the primary inductor 220. The currents flowing in opposing directions in each of the overlapping sections 880 of the primary inductor 220 and the auxiliary coil 820 form a parasitic coil thereby closing the lines of flux. Consequently, the induced voltage in the secondary inductor 320 is increased.

When the secondary inductor 320 is located at position B, such that it overlaps only with the auxiliary coil 820, energy transfer to the secondary inductor 220 may be improved by driving the auxiliary coil 820 with a phase shift of 180 degrees such that the driving voltage in the primary inductor 220 and the auxiliary coil 820 are in antiphase. The additive currents flowing in the overlapping section 880 of the primary inductor 220 and the auxiliary coil 820 produce a stronger oscillating magnetic field and thus a larger induced voltage in the secondary inductor 320.

Figure 8E:
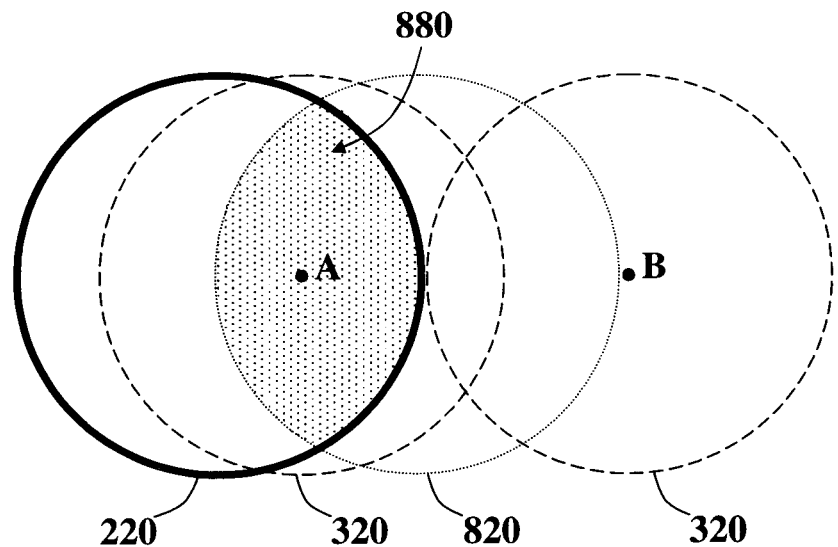
FIG. 8E schematically shows possible locations of a secondary coil relative to a primary inductor and one auxiliary coil.

For ease of explanation, only two coordinated coils 220, 820 are described in relation to FIG. 8E. Nevertheless, it will be appreciated that such a system may be readily extended to multiple coil arrangements such as triangular, quadrangular, hexagonal geometries or the like.

Plurality of Settings

Auxiliary coils may be configured to operate in at least one of the above settings. Where required, auxiliary coils may be configured to operate selectively in more than one setting.

Figure 8F:
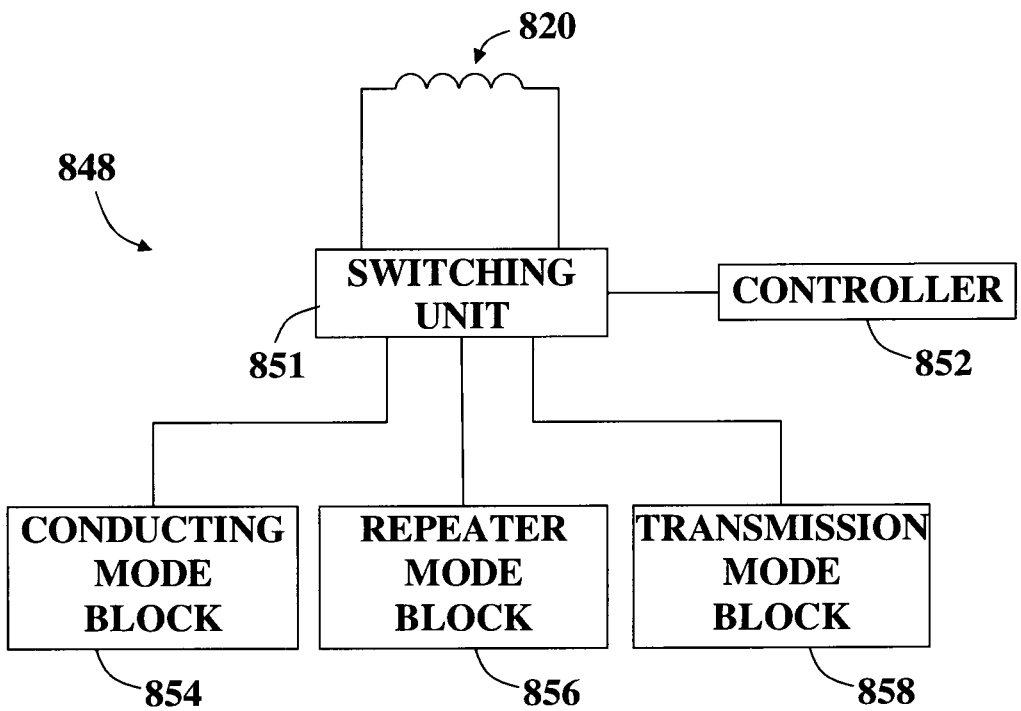
FIG. 8F shows the main elements of a possible auxiliary coil circuit configured to switch an auxiliary coil 820 between multiple modes.

Referring to FIG. 8F, the auxiliary coil circuit 848 includes at least one auxiliary coil 820, at least one controller 852, a conductor setting block 854, a repeater setting block 856, a transmission setting block 858 and at least one switching unit 851. The controller is operable to instruct the switching unit 851 to selectively connect the auxiliary coil to the conductor setting block 854, the repeater setting block 856 or the transmission setting block 858.

The conductor setting block 854 may include a circuit such as shown in FIG. 8B for example, optionally including an additional resistive element. The repeater setting block 856 may include a circuit such as shown in FIG. 8C for example. The transmission setting block 858 may include a circuit such as shown in FIG. 8D for example.

To illustrate a possible use of the auxiliary coil arrangement having multiple auxiliary coils, reference is again made to FIG. 8A. The auxiliary coils 820A-F may be connected to a common controller such that their operational setting are coordinated. For example, to improve power transmission to a secondary inductor 320 centered at point Q, auxiliary coils 820A-C may be operated in a conductor setting and auxiliary coils 820D-F may be operated in a repeater setting. Alternatively, auxiliary coil 820e may be operated in a transmission setting with its driving voltage in antiphase with the driving voltage of the primary inductor 220. Other setting combinations may be used, as required.

It is noted that such an auxiliary coil arrangement may improve the efficiency of energy transfer to a secondary inductor 320 using a primary inductor 220 having a constant operating frequency.

In an inductive power transmission system comprising auxiliary coils, a mode may be characterized by one or more auxiliary coils being connected to the conductor setting block 854, the repeater setting block 856 or the transmission setting block 858. The switching unit 851 may be configured to sequentially switch, or cycle through, one or more auxiliary coils between each of the plurality of settings (or a subset thereof). Alternatively or in addition, a mode may be characterized, as appropriate, by a combination of the setting of the auxiliary coils with other mode-characterizing features as described above, e.g., the location of the primary coil being activated, whether a single or a plurality of primary coils are being activated, and whether the voltages driving a plurality of primary coils are in phase or in antiphase.

Communication Channel

In reference to FIG. 1, it is noted that the inductive power transmission system 100 may, where appropriate, further include a communication channel 700. The communication channel 700 is provided to allow communication between the inductive power receiver 300 and the inductive power transmitter 200. Data may be passed between the inductive power receiver 300 and the inductive power transmitter 200 pertaining to their relative positions, identification, operational parameters such as required operating voltage, current, temperature or power for the electric load 340, the measured voltage, current, temperature or power supplied to the electric load 340 during operation, the measured voltage, current, temperature or power received by the electric load 340 during operation, and the like. Furthermore, the communication channel 700 may be used to communicate feedback signals from the receiver 300 to the transmitter 200 instructing the driver 230 to adjust operating parameters such as driving voltage, current or frequency. The signal transfer system may additionally be used to communicate other signals for a variety of functions such as inter alia, confirming the presence of a power receiver 300, communicating an identification signal or for communicating required power transmission parameters. The latter being particularly useful in systems adapted to work at multiple power levels.

The activation of the inductive power transmitter 200 may be manual or automatic, e.g., by the detection of the presence of an inductive power receiver within the interior of the inductive power transmitter via a communication channel. Various communication channels 700 may be used for the system such as an ultrasonic signals transmitted by piezoelectric elements or radio signals such as NFC tags, Bluetooth, WiFi and the like. Alternatively the primary and secondary inductors 220, 320 may themselves transfer communication signals using current and/or voltage modulation, frequency modulation or the like.

Inductive Power Receiver

An inductive power receiver 300 of the system 100 may include, inter alia, the reception circuit 310 which may include a regulator 330 provided to regulate the output voltage into a form suitable for the electric load 340. According to various systems, the regulator 330 may include rectification circuits, voltage control circuits, current control circuits or the like. Optionally, the inductive power receiver 300 may further include a resonance tuner 322 which may be used to adjust the resonant frequency of the reception circuit 310 to suit requirements. The electrical load 340 may be an electrochemical cell, a battery or a supercapacitor (alternatively electric double-layer capacitor (EDLC), supercondenser, electrochemical double layer capacitor, or ultracapacitor).

Determination and Tuning of Resonance

The strength of an induced voltage in the secondary inductor of an inductive couple varies according to the oscillating frequency of the electrical potential provided to the primary inductor. The induced voltage is strongest when the oscillating frequency equals the resonant frequency of the system. The resonant frequency $f_R$ of the system depends upon the inductance L and the capacitance C of the system according to the equation $$f_R = \frac{1}{2\pi\sqrt{LC}}.$$

The value of the inductance L and the capacitance C of the system are themselves dependent upon a number of parameters such as the inductance of the primary inductor, inductance of the secondary inductor, the distance therebetween, the geometry of the system, the mutual inductance, the capacitance of reception and transmission circuits and the like. As some of these parameters are likely to be variable in inductive transfer system, determination and tuning of the natural resonant frequency $f_R$ may be desirable.

Accordingly, referring back to FIG. 1, the inductive power receiver 300 may be provided with at least one resonance tuner 322. The receiver-side resonance tuner 322 may include a variable capacitor or bank of capacitors selectively connectable to the reception circuit 310 so as to vary the resonant frequency $f_R$. Alternatively, or additionally, a receiver-side resonance tuner 322 may include a variable inductor or bank of inductors selectively connectable to the reception circuit 310 so as to vary the resonant frequency $f_R$ in order to match the driving frequency of the inductive power transmitter 200.

Receiver Side Resonance Tuner

Figure 9:
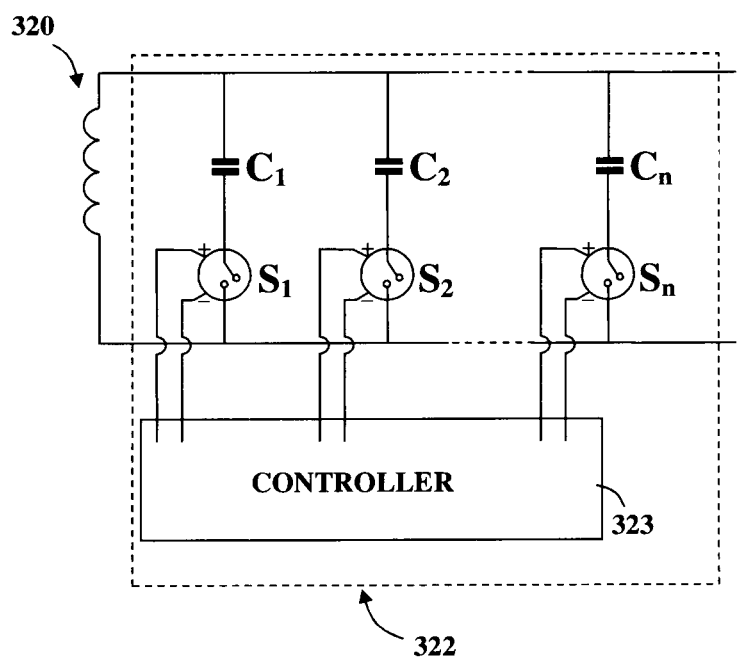
FIG. 9 is a circuit diagram schematically representing a possible example of a resonance tuner connected to a secondary inductor.

For illustrative purposes only, reference is now made to FIG. 9, schematically representing a circuit diagram of a possible example of a resonance tuner 322 connected to a secondary inductor 320. The resonance tuner 322 includes a controller 323, a plurality of capacitors $C_{1-n}$ and a plurality of switches $S_{1-n}$.

The controller 323 is configured and operable to selectively activate the switches $S_{1-n}$ to connect capacitors $C_{1-n}$ to the secondary inductor 320 thereby adjusting the natural resonant frequency of the reception circuit.

The controller 323 may comprise a processor executing an algorithm directed towards tuning the reception circuit in order to achieve a desired efficiency of power transfer. In particular, in loosely coupled mode, the controller may tune the reception circuit such that the resonant frequency matches the driving frequency of the primary inductor 220.

It is noted that capacitors $C_{1-n}$ of a variety of capacitance values may be connected in parallel or series to the reception circuit, according to various duty cycles in order to achieve the desired tuning. Alternatively, a plurality of capacitors with similar capacitance values may be provided which may be selectively switched into the circuit as required. Furthermore, such a capacitor bank may be used to regulate inductive power transfer at a constant driving frequency by tuning the circuit closer and further from resonance as required. Alternatively, frequency modulation may be used in combination with such receiver side power regulation.

It is noted that, in addition or alternatively to the capacitor back, various frequency modulation units may be incorporated into the system in order to adjust the natural frequency, discretely or continuously, in order to regulate the power provided to the electric load. For example, various inductance altering elements and capacitance altering elements are described in the applicants' copending applications U.S. Ser. No. 61/566,103, PCT/IL2010/000759 and PCT/IL2011/000341, each of which are incorporated herein by reference in its entirety. It is to be understood that other frequency modulation units may be alternatively used to suit requirements.

Resonance Seeking Arrangement

It is a feature of resonant power transfer that power is substantially delivered to the resonant reception circuit. This is particularly the case in loosely coupled systems. It will be appreciated, therefore, that a resonant driving frequency may be selected such that power may be provided from an inductive power transmitter to a particular inductive power receiver or set of receivers. That is, inductive power transfer systems may be configured to transmit power at the resonant frequency of the inductive couple. Thus, it is useful to know the natural resonant frequency of the system. After determining the natural resonant frequency, tuning mechanisms may then be employed to tune the resonant frequency in order to maintain optimal power transmission.

Alternatively, the inductive power transmission system may be manufactured according to strict specifications such that the resonance frequency is determined in advance. It is noted however that such strict specifications may impose limitations upon the tolerance of the manufacturing processes. Consequently many otherwise operational products of the manufacturing processes may be rejected during quality control. It will be appreciated that such limitations introduce significant extra overheads thereby greatly increasing the cost of manufacture of the system. Therefore systems having predetermined resonance frequencies are very difficult to mass-produce in an economically viable manner. Thus, the power transmission system may also comprise a resonance detection system.

The resonance of an inductive power system 100 is determined by the combination of the inductive power transmitter and the inductive power receiver. A single inductive power transmitter may be coupled to a number of individual inductive power receivers, and the prediction of the natural resonant frequency of the coupling during manufacture of the inductive power outlet may be impractical, or unduly limiting. Moreover, the natural resonant frequency of an inductive coupling may not be stable, and the system characteristics of the inductive power transfer system, possibly the inductive power receiver, the inductive power transmitter or both may fluctuate over time. Thus, over the lifetime of the system, the natural frequency of the system may vary.

For at least these reasons, other embodiments of the inductive power transfer system may comprise resonance-seeking arrangements configured to determine the natural resonance frequencies of the inductive power transfer system before and/or during operation. Once the natural resonance frequency of the system is determined, the resonance characteristics of an inductive power receiver may be tuned, as discussed above, such that the resonance frequency matches the driving frequency of the inductive power transmitter.

Induced Secondary Voltage Output

Electrical loads such as electrochemical cells, batteries and supercapacitors are sensitive to heat and overcurrent and overvoltage conditions. Care is needed when charging of an electrical load to follow a charging protocol, which is typically defined by the chemistry of said electrical load. Sophisticated electronic circuitry is often provided to control the power transfer, generate DC current/voltage, monitor and protect the electrochemical cell, and optimize its charging.

Figure 10:
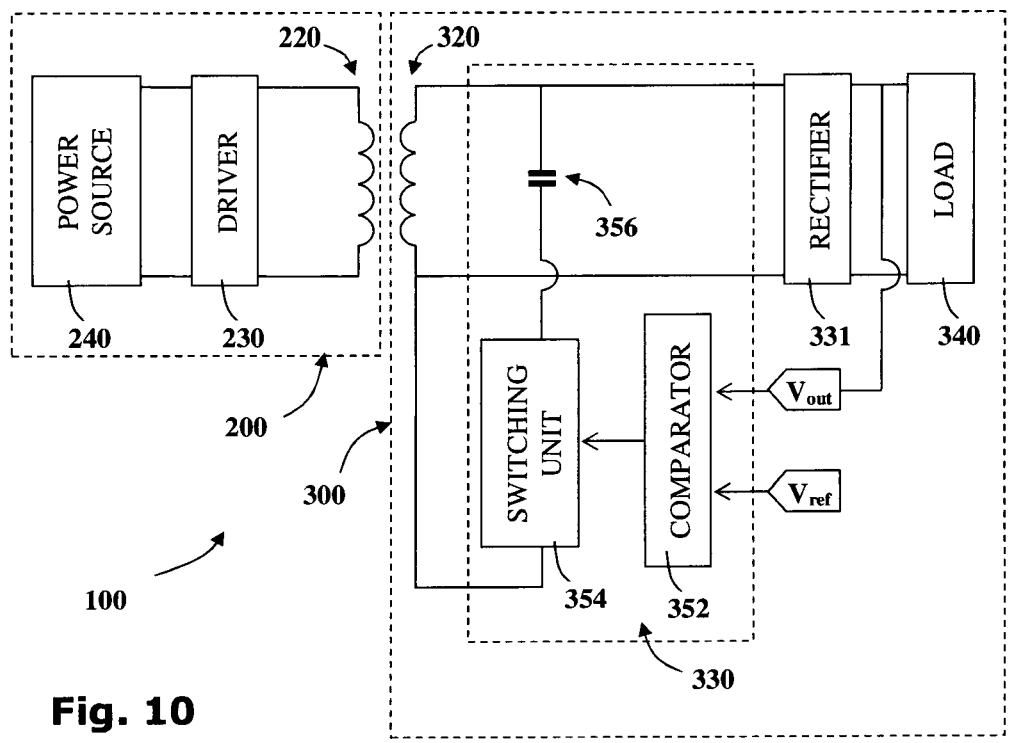
FIG. 10 is a schematic block diagram of the main electrical components of the inductive power transmission system including further details a regulator in the power reception circuit.

Referring now to FIG. 10, a block diagram is shown representing the main components of the inductive power transmission system 100. It is a particular feature that the regulation of power transfer, specifically the induced secondary voltage generated by the secondary inductor, is controlled, at least in part, by a regulator 330 in the inductive power receiver 300.

The inductive power receiver 300 includes a secondary inductor 320 wired to an electric load 340, typically via a rectifier 331. The secondary inductor 320 is configured such that, when placed in the oscillating magnetic field of an active primary inductor 220, a secondary voltage is induced across the secondary inductor 320. The secondary voltage may be used to power the electric load 340. It is noted that an induced secondary voltage across the secondary inductor 320 produces an alternating current (AC). Where the electric load 340 requires direct current (DC), such as for charging electrochemical cells, the rectifier 331 is provided to convert AC to DC. Where AC output is required, such as in the inductive power adaptor 1300c used for providing a mains-type output, an inverter, an AC-AC converter or the like (not shown) may be further provided.

The receiver-side regulator 330 is configured to directly monitor the output voltage produced by the secondary inductor 320 and to compare the monitored output value with the operating voltage required by the electric load 340. The regulator 330 is further configured to bring the monitored output voltage closer to the required operating voltage of the electric load 340 by adjusting the resonance frequency of the inductive transmission system 100. Optionally the regulator 330 may be further configured to monitor additional operating parameters, such as temperature, current and the like.

The receiver-side regulator 330 may comprise a comparator 352, a switching unit 354 and a resonance-altering component 356. The comparator 352 is typically configured to compare the monitored output voltage $V_{out}$ with a reference voltage $V_{ref}$ having a value indicating the required operating voltage of the electrical load. The switching unit 354 is typically configured to connect the resonance-altering component 356 to the power reception circuit when the difference between the monitored output voltage $V_{out}$ and the reference voltage $V_{ref}$ exceeds a threshold value.

The resonance-altering component 356 is selected such that when it is introduced into the power reception circuit the natural resonant frequency of the inductive power transfer system 100 is altered. One example of such a resonance-altering component 356 is a capacitor, which may be selectively connected to the reception circuit in parallel with the secondary inductor 220 to increase the natural resonant frequency of the inductive power transfer system 100. Other resonance altering components 356 (not shown) may include capacitors selectively connected in series with the secondary inductor 220 to reduce the natural resonant frequency, ancillary inductors connected to the secondary inductor 220 to increase the natural resonant frequency and the like. In certain embodiments a plurality of resonance-altering components 356 may be used in combination.

Further embodiments may include elements for reducing the output voltage $V_{out}$ if it rises above the required operating voltage $V_{req}$. Such voltage reducing elements may include resonance decreasing elements or alternatively switching units for intermittently disconnecting the load from the output voltage altogether.

Further embodiments may include elements for enabling trickle charging of the electric load 340. In trickle charging for a load such an electrochemical cell or a battery, a relatively low current is used to charge the load, typically at a similar rate as the self-discharging rate of the load, thus maintaining full capacity of the load. Optionally, the receiver side regulator 330 monitors the discharge voltage of the load 340. If the load discharge voltage is at a reference level signifying full charge, the switching unit may disconnect the load from the induced output voltage. If the load discharge voltage falls below the reference level, the switching unit may connect the load to the induced output voltage, thus resuming charging.

Power Pack

The inductive power receiver 300 comprises at least one secondary inductor 320 connectable to a regulator 330 and an electric load 340. The electric load 340 may be a power pack, e.g., an electrochemical cell, battery or a supercapacitor. The secondary inductor is configured to couple inductively with at least one primary inductor of the inductive power transmitter 200 such that power is transferred to charge the power cell. The inductive power receiver 300 may further comprise a resonance tuner 322.

According to various embodiments, the dimensions of the inductive power receiver 300, and characteristics of the power pack 340 are selected to be connectable or incorporated into a variety of electrical devices such as a remote control unit, a telephone, a media player, a game console, a personal digital assistant (PDA), a Walkman, a portable music player, a dictaphone, a portable DVD player, a mobile communications device, a calculator, a mobile phone, a hairdryer, a shaver, a defoliator, a delapidator, a wax-melting equipment, a hair curler, a beard trimmer, a light, a radio, an electric knife, a cassette player, a CD player and the like. Embodiments of the inductive power receiver 3000 may thereby provide inductive charging functionality to existing electrical devices with no modification of the electrical device itself.

Because the lifetime of an electrochemical cell may be shorter than the lifetime of the electrical device to which it provides power, electrical devices are typically designed such that their power packs are easily replaceable. The inductive power receiver 300 disclosed herein make use of this replaceablity by providing a battery, such as a lithium-ion electrochemical cell for example, configured to supply power at the voltage required to provide power to the associated electrical device. Suitable electrochemical cells include, for example, lithium-thionyl chloride cells or its variants such as the high energy density Li/SOCl2 Cells, Li/SO2 Cells, Li/MnO2 Cells, Lithium Polymer Cells, Special Cells, Mobile Phone Cells, Charger Li-ion Cells, NIMH Cells, New Products NiCd Cells or the like.

As such, the inductive power receiver 300 may be in a shape that is substantially the same as, and compatible with typical connection mechanisms for, standard battery shapes, for example, but not limited to: AAA (alternatively U16, Micro, Microlight, MN2400, MX2400, Type 286, UM 4, #7 or 6135-99-117-3143), AA (alternatively U7, Pencil sized, Penlight, Mignon, MN1500, MX1500, Type 316, UM3, #5, 6135-99-052-0009 or 6135-99-195-6708), C (U11, MN1400, MX1400, Baby, Type 343, BA-42, UM2, #2, 6135-99-199-4779 or 6135-99-117-3212), D (alternatively U2, Flashlight Battery, MN1300, MX1300, Mono, Type 373, BA-30, UM1, #1, 6135-9-464-1938 or 6135-99-109-9428), 9-Volt (alternatively PP3, Radio Battery, Smoke Alarm, MN1604, Square Battery, Krona, Transistor or 6135-99-634-8080), and Watch Cell (alternatively Button Cell, Coin Cell, Micro Cell or Miniature Cell). See also FIGS. 11A and 11B.

The electrochemical cell may be shielded to protect it from undesirable eddy currents within its conductive components.

Figure 11A:
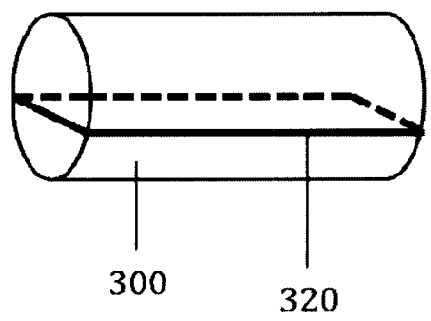
FIG. 11A is a schematic diagram showing a possible shape of the inductive power receiver and a possible configuration of the secondary inductor.
Figure 11B:
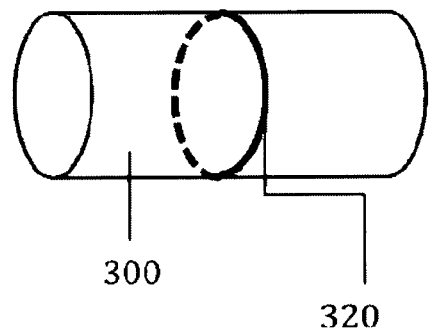
FIG. 11B is a schematic diagram showing a possible shape of the inductive power receiver and a possible configuration of the secondary inductor.

Referring to FIG. 11, in certain embodiments of the system, it is a particular feature of the inductive power receiver 300 that the secondary inductor 320 is a coil of conducting wire that is wrapped around the exterior of the inductive power receiver 300. The secondary inductor 320 may be configured to be in any orientation as appropriate, e.g., as shown in FIGS. 11A and 11B. The inductive power receiver 300 may comprise a plurality of secondary inductors arranged in a plurality of orientations.

Referring back to FIG. 1, it is a particular feature of embodiments of the regulator 330 that it may be operable to charge the power pack 340. Accordingly, in various embodiments, the regulator 330 may be configured to perform a variety of functions including, but not limited by, the following:

- rectification of alternating current (AC) generated by the secondary inductor 320 into direct current (DC) for charging the power pack 340,
- monitoring and regulating the charging voltage across the power pack 340,
- monitoring and regulating the charging current to the power pack 3400,
- monitoring and regulating the temperature of the power pack 3400, for example, by controlling the charging current,
- monitoring and regulating the energy transfer to the secondary inductor 320 from the primary inductor 220,
- indicating that the power pack 300 is fully charged, possibly via an charge indication light,
- monitoring charge status,
- monitoring voltage across the power pack 340,
- automatically terminating the charging process when the power pack 340 is fully charged,
- detecting faults,
- prevention of deep discharge of the power pack, and
- synchronization/communication with the battery pack electronics.

It is noted that over-charging may be damaging for many electrochemical cells. Therefore charging of the power pack 340 may be automatically terminated when the target voltage has been reached or the charging current has dropped below a predetermined level.

The regulator 330 may be configured for trickle charging of the power pack 340. In trickle charging for an electrochemical cell or a battery, a relatively low current is used to charge the load, typically at a similar rate as the self-discharging rate of the load, thus maintaining full capacity of the load.

Because excessive current can damage the power pack 340 and may be indicative of a short circuit or other fault, the regulator 330 may be configured to monitor charge or discharge current. Alongside the current monitor, the regulator 330 may further include a current limiter for reducing or cutting-off large currents in excess of the rated charge current, for example currents above 1.2 ampere or so, which may be damaging to the battery. Current monitoring and limiting functionality may be provided by means of a current sense resistor. It is further noted that, in embodiments in which a protection circuit disconnects the power pack when fully charged, the interface module may be further configured to ensure that the power pack is fully charged by periodically reactivating the charge current. Where required, a periodic refresh charging procedure may be activated after set intervals of, e.g., two hours.

It is noted that the charging process may be temperature dependent. High charging temperatures may damage the electrochemical cell and low temperatures may result in limited charging. Because of this temperature dependency, the interface circuit 100 may be further configured to monitor and regulate the power pack temperature during the charging. Optionally, a temperature sensor, such as a thermistor, thermocouple, digital sensors or the like, may be provided to monitor charging temperature and logic applied to limit charging current in order to keep the temperature within a preferred range. Notably, particular embodiments may be configured to operate within the internal temperature range from say minus ten degrees Celsius to forty-five degrees Celsius (263 Kelvin to 328 Kelvin).

Where required, indicators may be provided in the inductive power receiver 300 for indicating such states as excessive charge current, low charge current, excessive temperature, absence of load, battery charging, fully charged power pack, fault conditions and the like.

In addition, various features of the system may be directed towards allowing the control components to have smaller size. Embodiments described herein provide a simplified, smart, low cost and low profile electronic system for inductive charging of the power pack as well as an inductively enabled power pack.

It is a particular feature of the inductive power receiver 300 that that the reception circuit 310, or components thereof, may be incorporated into a printed circuit.

It is a particular feature of the inductive power receiver 300 that the reception circuit 310, or components thereof, may be incorporated into an integrated circuit (IC) configured to perform a plurality of control functions. It is noted that, in order to avoid compromising the size of the power pack 340, the dimensions of the reception circuit 310 should be minimized. Therefore, according to selected embodiments, the reception circuit 310 is an IC. In certain embodiments, the regulator 300 may be an incorporated into an Application-Specific Integrated Circuit (ASIC). ASICs may be preferred to other ICs as they generally have very small dimensions. In particular embodiments, a plurality of components of the reception circuit 310 can be assembled into one Multi Chip Module (MCM) or implemented in a Monolithic IC. In particular embodiments, all the components of the reception circuit 310 can be assembled into one Multi Chip Module (MCM) or implemented in a Monolithic IC.

A known limitation upon the size of electrical components is the rate at which they can dissipate heat. Smaller components do not dissipate heat as well as larger components. Selected embodiments of the system reduce the heat generated by the control components so that they may be of smaller dimensions.

A first heat reduction feature enabling small control components is that inductive transmission of power through loose coupling results in lower transmission voltages than tight coupling. Thus, configuring the inductive power transmitter and/or the inductive power transmitter to couple loosely may result in less heat being generated by control components and they may therefore have smaller dimensions.

In a second heat reduction feature, the embodiments may include elements for enabling trickle charging of the power pack 340. In trickle charging for a load such an electrochemical cell or a battery, a relatively low current is used to charge the load, typically at a similar rate as the self-discharging rate of the load, thus maintaining full capacity of the load.

A third heat reduction feature enabling small control components, which is used in other embodiments of the power pack, is that a low heat loss rectifier is used to convert AC power from the secondary inductor 320 to DC power to charge the electrochemical cell 340. Rather than using a bridge rectifier, in which four diodes are arranged in a Graetz circuit, a bridge synchronous rectifier may be used, such as that described in co-pending U.S. patent application Ser. No. 12/423,530, which is incorporated herein by reference. In the synchrorectifier, at least one of the four diodes of a typical Graetz circuit is replaced by a current-triggered electronic switch. For example a Power MOSFET may be configured to receive a gate signal from a current monitor wired to its own drain terminal. The current monitor may be configured to send a gate signal to the MOSFET when the drain-current exceeds a predetermined threshold.

Because the MOSFETs of the synchorectifier described above produce less heat than diodes, heat dissipation becomes easier even for high power or high frequency power transmission. Consequently, a rectifier with a smaller footprint may be included in the regulator 330, allowing it to be more easily contained within the inductive power receiver 300.

The various embodiments described hereinabove disclose inductive power transmission systems operable to transmit power efficiently over a wide range of intercoil spacings using a variety of performance enhancing elements. The scope of the disclosed subject matter includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. An inductive power transfer system comprising at least one of an inductive power transmitter and an inductive power receiver,
    said inductive power transmitter comprising least one primary inductor configured to couple inductively with at least one secondary inductor and at least one driver configured to provide a variable electric potential at a driving frequency across said primary inductor; and
    said inductive power receiver comprising at least one secondary inductor connectable to a receiving circuit and an electric load, said secondary inductor configured to couple inductively with said at least one primary inductor such that power is transferred to said electric load, said inductive power receiver further comprising a regulator operable to trickle charge the load, and further operable to provide a current to the load such that a rate of charging the load is substantially the same as a self-discharging rate of the load,
    wherein said inductive power transmitter is in the shape of a container and comprises an inductive charging space capable of holding at least one of said inductive power receivers, and wherein said inductive power transmitter comprises a plurality of primary inductors being positioned such that a first primary inductor produces a first magnetic field in an orientation that is different from the orientation of a second magnetic field produced by a second primary inductor.

2. The inductive power transfer system of claim 1, wherein the shape of the inductive power transmitter is selected from a group consisting of a sphere, a cube, a cuboid, a cylinder, a cone, a pyramid, a prism, a cup-like shape, a bucket-like shape and a box-like shape.

3. The inductive power transfer system of claim 1, wherein said inductive power transmitter is integrated into an item selected from a group consisting of a drawer, a desk, a table, a sofa, a cabinet compartment, a kitchen counter, a television table, a toy box, a tool box and an electronic device.

4. The inductive power transfer system of claim 1, wherein said plurality of primary inductors are positioned such that the first magnetic field is orthogonal in orientation to the second magnetic field.

5. The inductive power transfer system of claim 1, wherein said inductive power transmitter is box-shaped, and wherein said inductive power transmitter comprises three primary inductors, each primary inductor situated in three adjacent walls of said inductive power transmitter.

6. The inductive power transfer system of claim 1, wherein said inductive power transmitter is operable in a plurality of modes, a mode being characterized by the activation of at least one primary inductor, and
    wherein said inductive power transmitter further comprises a mode selector configured to sequentially switch the inductive power transmitter between said plurality of modes.

7. The inductive power transfer system of claim 1, wherein the inductive power receiver comprises a resonance tuner operable to tune a resonant frequency of said receiving circuit to a driving frequency of the primary inductor.

8. The inductive power transfer system of claim 1, wherein the inductive power receiver comprises a resonance tuner operable to tune the resonant frequency of the inductive power transfer system such that the inductive power transmitter and the inductive power receiver are resonantly coupled.

9. The inductive power transfer system of claim 8, wherein the inductive power receiver further comprises a resonance seeking arrangement operable to determine the natural resonant frequencies of the inductive power transfer system.

10. The inductive power transfer system of claim 1, wherein the regulator is operable to monitor the discharge voltage of the load, and wherein the regulator comprises a switching unit operable to disconnect the load from the induced output voltage from the secondary inductor if the discharge voltage of the load is at a reference level signifying full charge, and further operable to connect the load to the induced output voltage from the secondary inductor if the discharge voltage of the load is below the reference level signifying full charge.

11. The inductive power transfer system of claim 1, further comprising a position sensor operable to monitor a position of the inductive power receiver in relation to the inductive power transmitter, wherein the position sensor is operable to activate the primary inductor of the inductive power transmitter if the inductive power receiver is within an inductive charging space of the inductive power transmitter.

12. The inductive power transfer system of claim 1, wherein the inductive power transmitter is operable to transmit power to the inductive power receiver when the inductive power transmitter and the inductive power receiver are coupled with a low coefficient of coupling.

13. The inductive power transfer system of claim 1, wherein the inductive power transmitter and the inductive power receiver are configured to be resonantly coupled.

14. The inductive power transfer system of claim 1, wherein the electrical load is selected from a group consisting of an electrochemical cell, a battery and a supercapacitor.

15. The inductive power transfer system of claim 14, wherein the electrochemical cell is selected from a group consisting of a lithium-thionyl chloride cell, a $Li/SOCl_2$ Cell, a $Li/SO_2$ Cell, a $Li/MnO_2$ Cell, a Lithium Polymer Cell, a Special Cell, a Mobile Phone Cell, a Charger Li-ion Cell, a NiMH Cells and a New Products NiCd Cells.

16. The inductive power transfer system of claim 1, wherein the inductive power receiver is in a shape that is substantially the same as, and compatible with typical connection mechanisms for, a standard battery shape selected from a group consisting of AAA, U16, Micro, Microlight, MN2400, MX2400, Type 286, UM 4, #7, 6135-99-117-3143, AA, U7, Pencil sized, Penlight, Mignon, MN1500, MX1500, Type 316, UM3, #5, 6135-99-052-0009, 6135-99-195-6708, C, U11, MN1400, MX1400, Baby, Type 343, BA-42, UM2, #2, 6135-99-199-4779, 6135-99-117-3212, D, U2, Flashlight Battery, MN1300, MX1300, Mono, Type 373, BA-30, UM1, #1, 6135-9-464-1938, 6135-99-109-9428, 9-Volt, PP3, Radio Battery, Smoke Alarm, MN1604, Square Battery, Krona, Transistor, 6135-99-634-8080, Watch Cell, Button Cell, Coin Cell, Micro Cell and Miniature Cell.

17. The inductive power transfer system of claim 1, wherein the secondary inductor is a coil of conducting wire that is wrapped around the exterior of the inductive power receiver.

18. The inductive power transfer system of claim 17, wherein said inductive power receiver may comprise a plurality of secondary inductors arranged in a plurality of orientations.

19. The inductive power transfer system of claim 1, wherein the inductive power receiver is incorporated into an electrical device selected from a group consisting of remote control units, telephones, media players, PDAs, Walkmans, portable music players, dictaphones, portable DVD players, mobile communications devices, calculators, mobile phones, hairdryers, shavers, defoliators, delapidators, wax-melting equipment, hair curlers, beard trippers, lights, radios, electric knives, cassette players, and CD players.

20. An inductive power receiver comprising at least one secondary inductor connectable to a receiving circuit and an electric load, said secondary inductor configured to couple inductively with a primary inductor such that power is transferred to said electric load, said inductive power receiver further comprising a regulator operable to trickle charge the load, and further operable to provide a current to the load such that a rate of charging the load is substantially the same as a self-discharging rate of the load.

* * * * *